United States Patent
Richter

(10) Patent No.: US 10,060,575 B2
(45) Date of Patent: Aug. 28, 2018

(54) PARTITION BRACKET ASSEMBLY

(71) Applicant: Adrian Steel Company, Adrian, MI (US)

(72) Inventor: Thomas S. Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 15/812,113

(22) Filed: Nov. 14, 2017

(65) Prior Publication Data

US 2018/0195662 A1    Jul. 12, 2018

Related U.S. Application Data

(60) Provisional application No. 62/444,020, filed on Jan. 9, 2017.

(51) Int. Cl.
*B62D 21/00* (2006.01)
*F16M 13/02* (2006.01)
*B60R 21/02* (2006.01)

(52) U.S. Cl.
CPC ........... *F16M 13/02* (2013.01); *B60R 21/026* (2013.01)

(58) Field of Classification Search
CPC .............................. F16M 13/02; B60R 21/026
USPC .................................... 280/728.2; 248/694
See application file for complete search history.

(56) References Cited

U.S. PATENT DOCUMENTS

| | | | | |
|---|---|---|---|---|
| 6,460,385 | B1 * | 10/2002 | Vito | B60R 25/0225 70/209 |
| 7,597,345 | B1 * | 10/2009 | Kim | B60R 21/213 280/728.2 |
| 9,855,910 | B2 * | 1/2018 | Fischer | B60R 21/213 |
| 2004/0145164 | A1 * | 7/2004 | North | B60R 21/2165 280/732 |
| 2006/0255568 | A1 * | 11/2006 | Demel | B60R 21/201 280/728.2 |

* cited by examiner

*Primary Examiner* — Gwendolyn Wrenn Baxter
(74) *Attorney, Agent, or Firm* — Marshall & Melhorn, LLC

(57) ABSTRACT

Road and curb partition bracket assembly comprise front and rear clamp brackets and a channel mounting bracket. Each partition bracket is drawn together by a bolt across a respective vehicle B-pillar for mounting a partition across an interior of a vehicle. The mounting of the partition bracket assembly with the partition attached is accomplished without disturbing an exterior or an interior of the B-pillars, or any contents therein on either side of the vehicle.

15 Claims, 4 Drawing Sheets

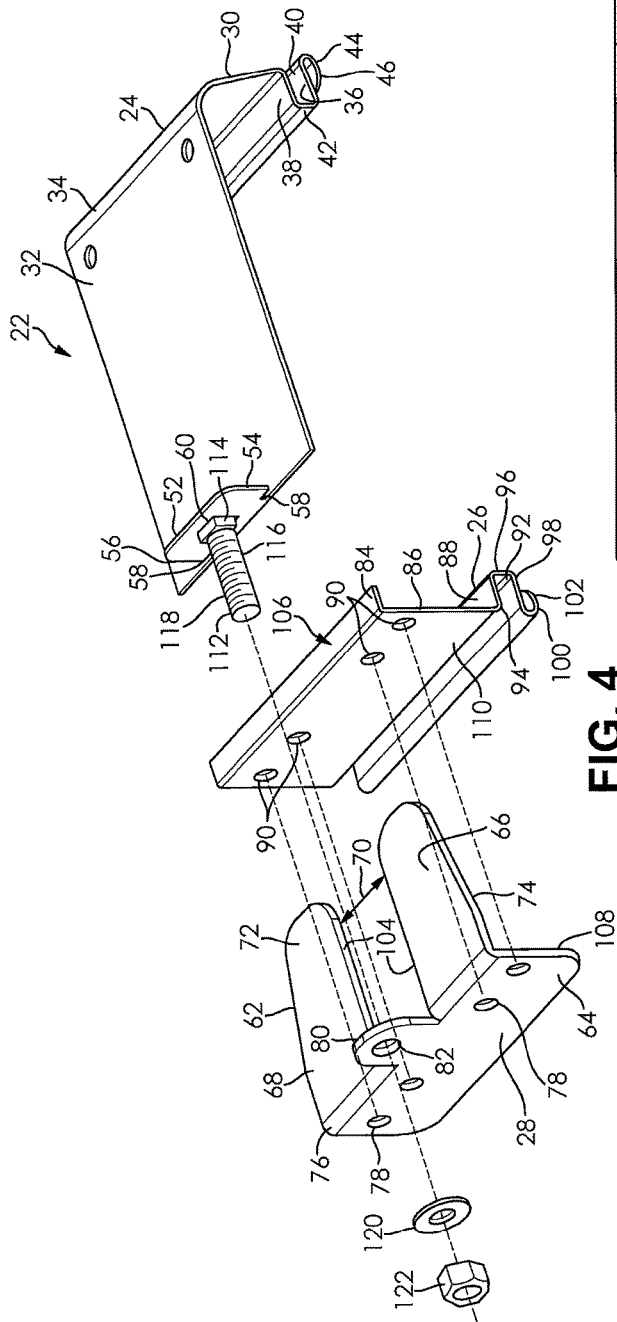
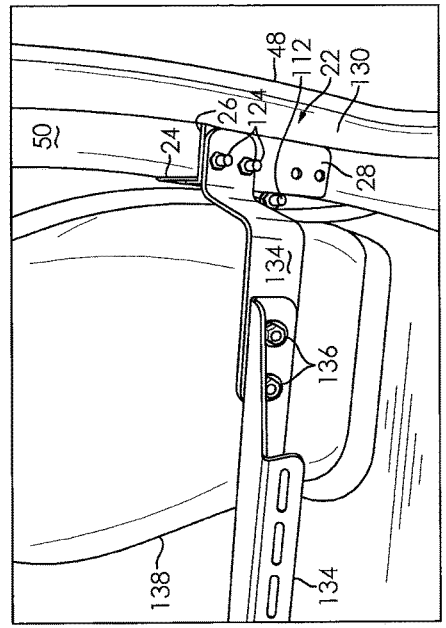
FIG. 4
FIG. 5

PARTITION BRACKET ASSEMBLY

FIELD OF THE DEVICE

The device relates to a partition bracket assembly. More particularly, the device relates to a partition bracket assembly that attaches a vehicle partition, which separates a cab, or operator, area of a vehicle from the rest of the vehicle, to a vehicle pillar.

BACKGROUND OF THE DEVICE

Commercial vehicles and some passenger vehicles have been adapted to include an interior compartment partition that isolates a vehicle operator cab portion from a designated cargo or passenger portion. Generally, this was achieved by rigidly securing the partition to the vehicle B-pillar and/or a structural roof bow of the vehicle so that a sturdy partition was created. The rigid connection was achieved through the use of mechanical fasteners that went through the partition and into the vehicle B-pillar or roof bow. In these cases, the fasteners went through the B-pillar wall and extended into the B-pillar interior cavity.

As it turns out, however, disturbing the B-pillar with fasteners and holes for the fasteners is problematic. For example, the B-pillar is now used to store side impact air bags. In addition, side impact crash sensors and the accompanying control modules for such systems may also be stored in the B-pillar. In the case of Lane Detection Systems, the B-pillar is often utilized to store radar or lidar systems, as well as the accompanying control modules to provide alerts to the vehicle operator as necessary.

The wiring for vehicles has also increased in complexity. The roof bows and B-pillars, which used to strictly provide structural support, are now used as conduits in which wiring is run to power the safety systems and for other systems within the vehicle.

The use of the B-pillars and the roof bows for safety systems and wiring conduits has greatly reduced their ease for use as mounting structures for cargo partition systems. Indeed, mounting a cargo area partition to the roof bow may risk damaging the wiring that runs through the roof bows. Moreover, attaching a partition directly to the B-pillar may damage the safety systems stored therein and further may interfere with the deployment of air bags stored in the B-pillar.

Vehicle Original Equipment Manufacturers (OEMs) are now discouraging anyone from forming holes in the B-pillars or other vehicle structures. The OEMs have found that when holes are formed in these structures that the debris from forming the holes can interfere with other systems. By way of example, debris from a hole drilled into a B-pillar can find its way into seat belt retractors, which are often located in the base of the B-pillar. The debris in the retractors can cause them to not work properly or even fail.

Hence, there is a need for a partition bracket system that rigidly mounts a cargo or a vehicle compartment partition to a vehicle without requiring forming holes in or even welding to a B-pillar of the vehicle. As result, disruption of wiring and negatively affecting the vehicle's safety systems are avoided.

SUMMARY

A vehicle partition bracket assembly comprises front and rear clamp brackets. A channel mounting bracket is provided as well. The assembly mounts a partition to vehicle B-pillars within an interior of a vehicle.

BRIEF DESCRIPTION OF THE DRAWINGS

The advantages of the present device will become readily apparent to those skilled in the art from the following detailed description when considered in the light of the accompanying drawings in which:

FIG. 4 is an exploded view of the assembly in FIG. 3;

FIG. 5 is a view of a joining bracket attached on one end to a channel mounting bracket and on the other end connected to a cross channel bracket.

DETAILED DESCRIPTION OF THE DEVICE

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting.

Figure 1:
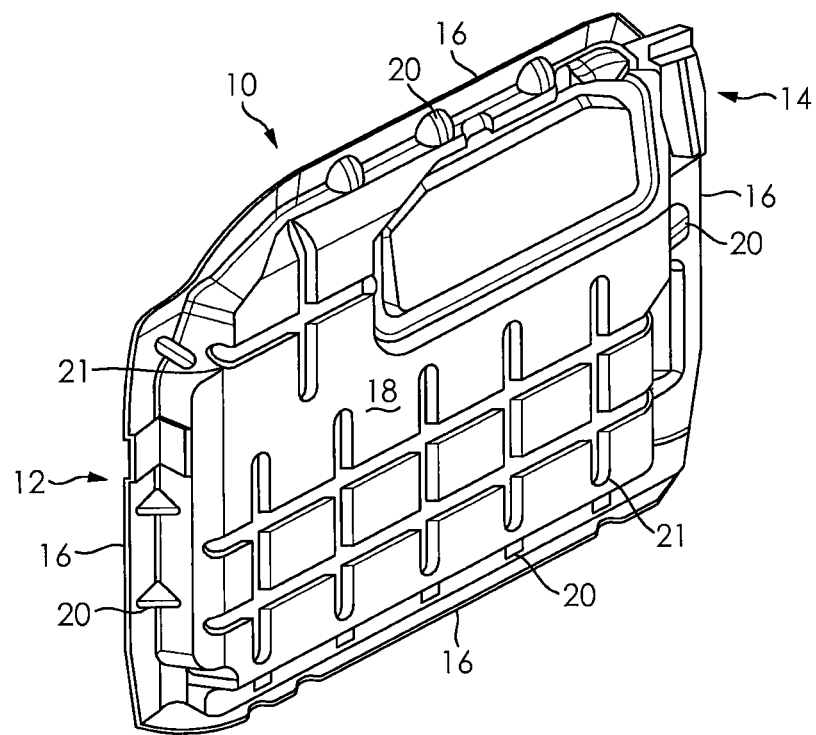
FIG. 1 is a perspective view of an embodiment of a partition that may be used with a bracket assembly.

FIG. 1 illustrates one embodiment of a vehicle partition 10 having a road side 12 and a curb side 14. While FIG. 1 illustrates one embodiment of a partition, other embodiments may be permissible. These embodiments may include, but are not limited to, partial partitions, and partitions of different shapes, sizes and functions than depicted and described herein.

Preferably, a perimeter flange 16 continuously surrounds a body portion 18 of the partition 10 without, or substantially without, interruption. The perimeter flange 16 extends radially outward from the body portion 18 around the partition 10. By way of example, the perimeter flange 16 may extend substantially transverse from the body portion 18.

In one embodiment, flange ribs 20 are unitary, integrally formed, and typically one piece with the partition 10. The flange ribs 20 support the perimeter flange 16 with respect to the body portion 18. More particularly, the flange ribs 20 connect the body portion 18 with the perimeter flange 16 by way of angled sections of material.

In the depicted embodiment, body ribs 21 are unitary with and integrally formed within the body portion 18. These body ribs 21 comprise a series of connected horizontal and vertical recessed grooves that span continuously across the body portion 18. The body ribs 21 provide rigidity and strength to the partition 10. Hence, the partition 10 can be thinner while requiring less overall material.

The partition 10 may be substantially one piece, integrally formed and unitary. In the depicted embodiment, the partition 10 may have a window located therein. The partition 10 may have one or more windows, doors, panels, drawers and/or other components.

For the present device, separate partition bracket assemblies 22 secure the road side 12 and the curb side 14 of the partition 10 to a vehicle. Although not illustrated for the road side 12, the following described structure for the curb side partition bracket assembly 22 applies to a separate partition roadside partition bracket assembly 22.

Figure 3:
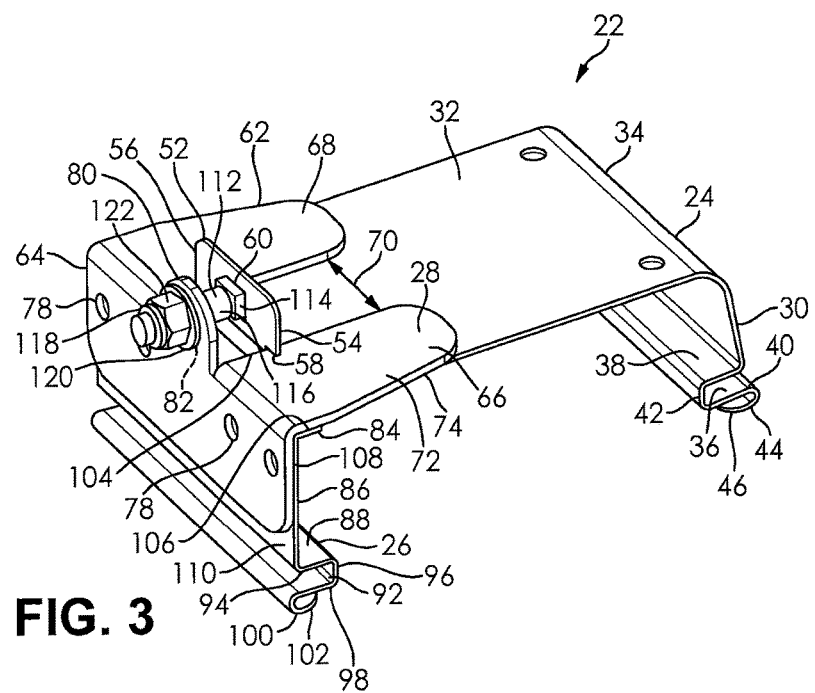
FIG. 3 is a perspective view of the B-pillar bracket assembly of FIG. 2.
Figure 6:
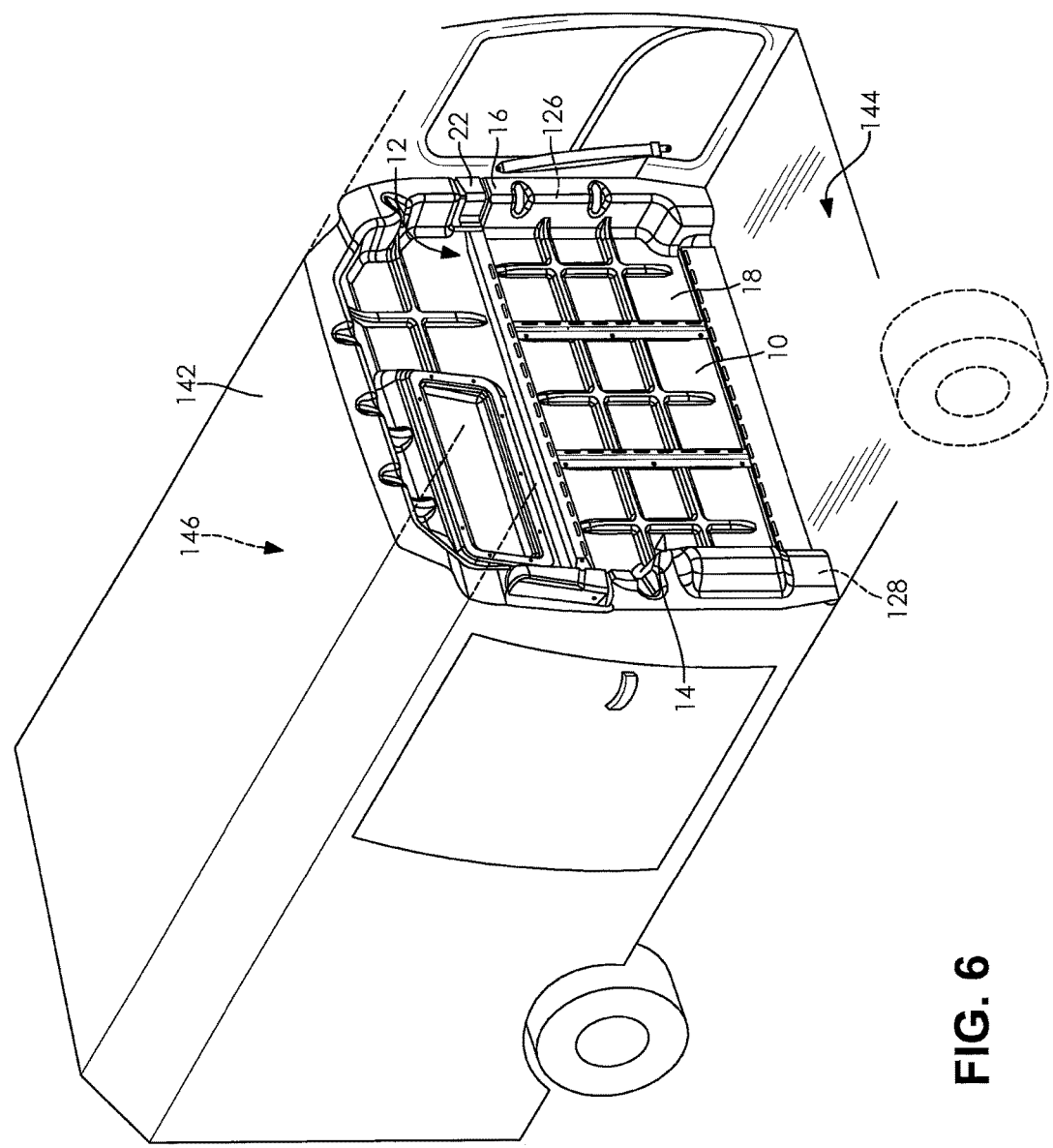
FIG. 6 is a view of one embodiment of the partition of FIG. 1 located in a cargo portion of a vehicle.

FIGS. 3 and 4 illustrate one embodiment of the partition bracket assembly 22. The assembly 22 comprises a front clamp bracket 24, a rear clamp bracket 26, and a channel mounting bracket 28. The front clamp bracket 24, the rear clamp bracket 26, and the channel mounting bracket 28 may be individually unitarily, integrally formed, and one piece from a single material, such as steel.

FIGS. 3 and 4 show the front clamp bracket 24 as generally L-shaped. The front clamp bracket 24 has a leading portion 30 and a rearwardly extending portion 32. The leading portion 30 and the rearwardly extending portion 32 are unitary, one piece and integrally formed. The two portions 30, 32 are oriented in transverse planes with respect to one another and connected by a curvilinear transition portion 34.

Opposite from the transition portion 34, the leading portion 30 has a front door seal channel 36. The front door seal channel 36 is unitary, integrally formed and one piece with the bracket 24. The front door seal channel 36 is a generally C-shaped channel that opens away from the rearwardly extending portion 32. The channel 36 is comprised of three components. The first and second components 38, 40 are parallel but non-planar with one another; they are also parallel with the rearwardly extending portion 32. The third component 42 is transverse the first and second components 38, 40 and connects the first and second components 38, 40. The third component 42 is non-planar but parallel with the leading portion 30.

Figure 2:
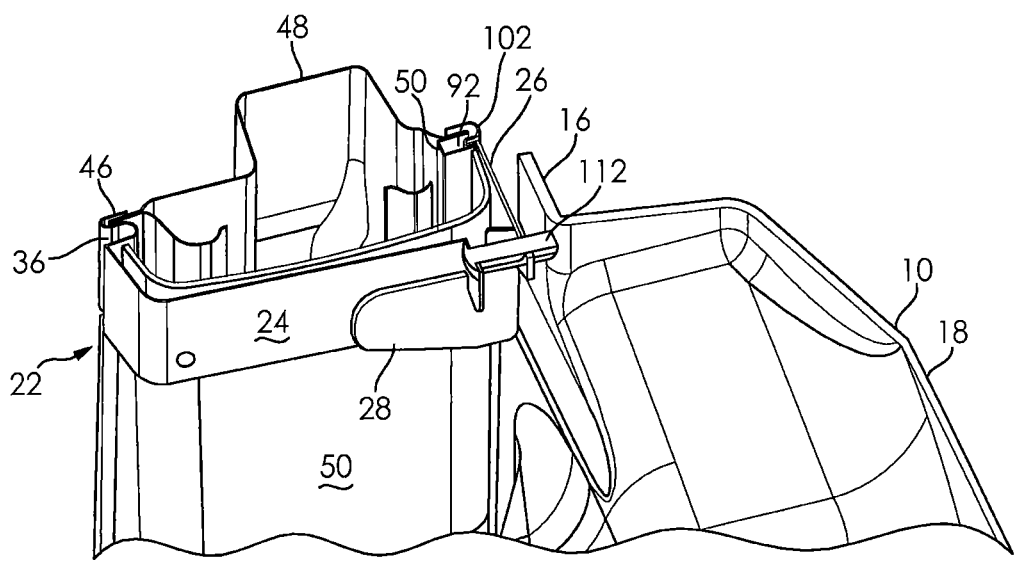
FIG. 2 is a perspective cutaway view of a portion of a vehicle B-pillar bracket assembly clamped on an internal curb side B-pillar trim and connected to a partition perimeter flange of the partition of FIG. 1.

Opposite the connection of the second component 40 to the third component 42, the second component 40 transitions to a flange 44. The flange 44 comprises a rearward directed lip 46. The lip 46 is parallel the first and second components 38, 40 but non-planar therewith. The flange 44 is used to clamp the front of an exterior B-pillar trim 48 and an interior B-pillar trim 50 therein, as shown in FIG. 2.

The rearwardly extending portion 32 is generally planar from the transition portion 34 to a rear flange 52. The rearwardly extending portion 32 may taper from the transition portion 34 to the rear flange 52.

The rear flange 52 is unitary, integrally formed and one-piece with the rearwardly extending portion 32. The rear flange 52 extends generally transverse to the rearwardly extending portion 32, and in a direction opposite from the leading portion 30.

The rear flange 52 has first and second opposite sides 54, 56. Slots 58 are provided in each side 54, 56 adjacent where the rear flange 52 connects to the rearwardly extending portion 32. The slots 58 receive another portion of the bracket assembly described below.

The rear flange 52 may be centered at the end of the rearwardly extending portion 32. Preferably, an aperture 60 is located in the rear flange 52. Most preferably, the aperture 60 is square in shape and it extends entirely through the rear flange 52. The aperture 60 is generally centered in the rear flange 52.

The channel mounting bracket 28 is generally L-shaped. It has a forward extending portion 62 and a downwardly extending portion 64 transverse to the forward extending portion 62.

The forward extending portion 62 may be comprised of a first and a second tab 66, 68 separated from one another by a gap 70. The tabs 66, 68 are substantially the same in size and shape and are coplanar with one another. Both tabs 66, 68 have an upper surface 72 and an opposite lower surface 74.

The forward extending portion 62 transitions, such as through a radiused portion 76, to the downwardly extending portion 64. The downwardly extending portion 64 is substantially planar.

The downwardly extending portion 64 may have a plurality of apertures 78 located therein. As shown in FIGS. 3 and 4, the apertures 78 may be of equal size and shape with respect to one another. In one embodiment, there are two apertures 78 aligned with the first tab 66 and there are two apertures 78 aligned with the second tab 68.

Extending upwardly, opposite the downwardly extending portion, but planar therewith, is a fastener flange 80. The fastener flange 80 preferably extends upwardly between the two tab portions 66, 68.

An aperture 82 may be located through the flange 80. The aperture 82 may be centered in the flange 80 and extend therethrough. The aperture 82 may be round.

The rear clamp bracket 26 is generally C-shaped. The bracket 26 is comprised of a first leg 84, a second leg 86 and a third leg 88. Together, the legs 84, 86, 88 form the general C-shape of the bracket 26.

The first leg 84 extends transverse the second leg 86. The second leg 86, which is longer than the first and third legs 84, 88, extends from the first leg 84. The second leg 86 has a plurality of apertures 90 that are substantially the same in size and shape as the apertures 78 in the downwardly extending portion 64 of the channel mounting bracket 28. The apertures 78 in the downwardly extending portion 64 are designed to align with the apertures 90 in the rear clamp bracket 26 to make continuous passages therethrough.

The second leg 86 extends to the third leg 88. The third leg 88 is transverse the second leg 86; the third leg 88 is parallel but non-planar with the first leg 84.

The third leg 88 forms part of a rear door seal channel 92. The rear door seal channel 92 opens opposite the front door seal channel 36. The rear door seal channel 92 is generally C-shaped.

The rear door seal channel 92 is comprised of three components. The first component 94 is the third leg 88. The second component 96 extends transverse the first component 94. The third component 98 extends transverse the second component 96. Thus, the first and third components 94, 98 are nonplanar but parallel with one another. The first and second components 94, 98 are parallel but not planar with the rearwardly extending portion 32.

The second component 96 is parallel but nonplanar with the second leg 86 of the rear clamp bracket 26. The first and third components 94, 98 are parallel but nonplanar with the first leg 84 of the rear clamp bracket 26. Opposite the connection of the second leg 86 to the third leg 88, the third leg 88 transitions to a flange 100. The flange 100 comprises a forward directed lip 102. The lip 102 is parallel the third and first legs 84, 88 but nonplanar therewith. The flange 100 is used to clamp the rear of the exterior B-pillar trim 48 and the interior B-pillar trim 50 therein, as shown in FIG. 2.

FIG. 3 depicts the partition bracket assembly 22 assembled. In this state, a portion of the rearwardly extending portion 32 is located under the channel mounting bracket 28. More particularly, the lower surface 74 of tabs 66, 68 are directly above and in contact with the rearwardly extending portion 32. Further, inner edges 104 of the first and second tabs 66, 68 are located within the slots 58 on either side of the rear flange 52 of the front clamp bracket 24. The rear flange 52 extends upwardly transverse from the tabs 66, 68. Based on the engagement of the tabs 66, 68 with the slots 58 and the overlapping nature of the tabs 66, 68 and the rearwardly extending portion 32, it can be appreciated that the front clamp bracket 24 and channel mounting bracket 28 are secured together.

The channel mounting bracket 28 and the rear clamp bracket 26 are also located in direct contact with one another. For example, an outer surface 106 of the first leg 84 is in direct contact with the lower surface 74 of the tabs 66, 68. In addition, an inside surface 108 of the downwardly extending portion 64 is located in direct contact with an outside surface 110 of the second leg 86.

In the assembled state, the front door seal channel 36 may be parallel and/or planar with the rear door seal channel 92, as shown in FIG. 3.

The rear clamp bracket 26, the channel mounting bracket 28 and the front clamp bracket 24 may also be connected and/or secured to one another by a mechanical fastener. The fastener may be such as a bolt 112.

In one embodiment, the bolt 112 has a head 114 and a body portion 116. The head 114 may have a square shape. The square head 114 is located in the rear flange aperture 60, which also has a square shape. The complementary shapes of the bolt head 114 and the aperture 60 prevent relative rotation of the bolt 112 with respect to the aperture 60.

The body portion 116 of the bolt 112 may have threads 118 located thereon. The threaded body portion 116 is located through the flange aperture 82 and extends beyond the flange aperture 82. A washer 120 and a nut 112 may be located on the portion of the threaded body 116 that extends beyond the flange aperture 82. It can be appreciated that as the nut 112 is rotated onto the threaded body 116, the nut 112 and threaded body 116 draws the channel mounting bracket 28 to, and into direct contact with, the rear clamp bracket 26 and the front clamp bracket 24. The bolt 112 and nut 122 also lock the channel mounting bracket 28 to the rear clamp bracket 26 and the front clamp bracket 24. Of course, the nut 122 can be selectively backed off the bolt 112 to loosen the components of the partition bracket assembly 22.

The partition bracket assembly 22 may be selectively located on the B-pillar trims 48, 50, as shown in FIGS. 2 and 5. Preferably, the aligned apertures 90, 78 in the rear clamp bracket 26 and the channel mounting bracket 28 receive at least one mounting bolt 124 therethrough. As shown in FIG. 5, preferably two mounting bolts 124 are located through two of the aligned apertures 78, 90. The bolts 124 extend rearwardly with respect to the vehicle orientation. Nuts, with or without washers, may be located on the bolts 124 to secure the assembly to the B-pillar trims 48, 50.

In no manner do the mounting bolts 124 negatively affect or change the exterior or interior B-pillar trims 48, 50, or systems located within the pillars 126, 128. For example, the mounting bolts 124 do not break, intrude, or enter the B-pillar 126, 128 or the trims 48, 50. Hence, the design of the partition 10, in conjunction with the above-described partition bracket assembly 22, does not require mechanical holes to be formed in or around the B-pillars 126, 128 or the trims 48, 50. As no holes are required, no debris can enter the pillars 126, 128 and the structures within the pillars are not affected.

Upon tightening the nut 122 onto the bolt 112, the front clamp bracket flange 52 and the rear clamp bracket flange 100 engage the exterior and interior B-pillar trims 48, 50. Consequently, the partition bracket assembly 22 is tightly secured and clamped around the interior B-pillar trim 48, 50 within the front and rear clamp bracket flanges 52, 100. Thereby, the front and rear door seal channels 36, 92 are available for installation of their respective door seals 130.

A curb side joining bracket 132 is attached to the partition bracket assembly 22 by way of the two vertically aligned mounting bolts 124. As mentioned above, the bolts 124 are inserted into the apertures 78, 90. With the bolts 124 pointed to the rear of the vehicle, the nuts with washers, are tightened onto the bolts 124, thereby securing the mounted partition bracket assembly 22 to the curb side joining bracket 132.

A cross channel bracket 134 may be attached to the joining bracket 132 by way of bracket bolts 136. Although not shown, the road side of the cross channel bracket 134 is similarly attached to a complementary road side joining bracket, which in turn is attached to a complementary road side partition bracket assembly 22 that is mounted to road side B-pillar exterior and interior trims 46, 48. The same structures and procedure is used to attach the road side assembly as described for the curb side.

The partition 10 may be directly connected at least to the cross channel bracket 134. The connection may be through such as mechanical fasteners, like nuts, bolts and washers. In one embodiment, a plurality of bolts may extend through one or more apertures in the cross channel bracket 134 and through the partition, where at least one nut and washer secure the assembly together.

A passenger seat 138 is shown in FIG. 4 to provide a perspective view of the partition bracket assembly 22 mounting location on the curb side 14 of the vehicle.

After the partition bracket assembly 22 is fully clamped to the B-pillar trims 48, 50, a front door seal (not shown) is installed in the front door seal channel 36. Likewise, a rear door seal 130 is installed in the rear door seal channel 92. Although not shown, a similar road side partition bracket assembly is essentially the same as the above stated curb side partition bracket assembly, where the road side partition bracket assembly clasps a corresponding road side interior and exterior B-pillar trims 48, 50.

Hence, the above-detailed partition bracket assembly 22 allows for rigidly mounting the partition 10 to the vehicle, without requiring drilling of holes in, or a welding to, B-pillars. As a result, disruption of wiring and negatively affecting vehicle safety systems are avoided.

FIG. 5 depicts the partition 10 of FIG. 1 in one embodiment of a vehicle 142. The partition 10 is depicted connected to the road side 12 and curb side 14 B-pillars 126, 128 of the vehicle 10 as described above. The partition 10 separates a cabside or passenger compartment 144 of the vehicle 142 from a cargo portion 146 of the vehicle 10.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:
1. A partition bracket assembly, comprising:
 a front clamp bracket comprising a planar rearwardly extending portion and a leading portion, wherein said leading portion is connected to a front door seal channel opening in a first direction and said rearwardly extending portion is connected to a rear flange;
 a channel mounting bracket comprising two planar tabs separated from one another by a gap and said rear flange, said tabs being connected to a transverse downwardly extending portion via a radiused portion, said channel mounting bracket having a fastener flange extending parallel and planar with said downwardly extending portion; and a rear clamp bracket comprising three legs and a rear door seal channel opening in a second direction opposite the first direction.

2. The assembly of claim 1, wherein said front door seal channel is comprised of a first component, a second component and a third component wherein said first and second components are parallel one another but nonplanar with respect to one another and the third component is transverse said first and second components.

3. The assembly of claim 2, wherein a rearward directed lip is connected to said second component, wherein said rearward directed lip is at least partially parallel said second component but nonplanar therewith.

4. The assembly of claim 2, wherein said first and second components are parallel but not co-planar with said rearwardly extending portion.

5. The assembly of claim 2, wherein said second component transitions to a lip oriented in a direction opposite the front door seal channel.

6. The assembly of claim 1, wherein said rearwardly extending portion is substantially transverse said leading portion, wherein said rearwardly extending portion is connected to said leading portion by a curvilinear transition portion.

7. The assembly of claim 1, wherein said rear flange is oriented transverse said rearwardly extending portion, said rear flange having an aperture centered therein, said rear flange having slots on either side of the rear flange.

8. The assembly of claim 1, wherein said fastener flange has a fastener aperture centered therein.

9. The assembly of claim 1, wherein said downwardly extending portion having at least one aperture aligned with one tab and another at least one aperture aligned with the other tab.

10. The assembly of claim 1, wherein said three legs comprise a second leg that is transverse first and third legs, wherein said first and third legs are parallel but not planar with one another.

11. The assembly of claim 1, wherein said rear door seal channel comprises three components wherein a first of said three components is the third leg, wherein said first and third components are parallel but non-planar with one another and said second component is transverse said first and third components.

12. The assembly of claim 1, wherein said third component transitions to a flange and lip oriented in an opposite direction to said rear door seal channel.

13. The assembly of claim 1, wherein a fastener having a square end is located in a rear flange aperture, which has a complementary square shape, said fastener located in said fastener aperture of the fastener flange.

14. The assembly of claim 1, wherein said front door seal channel and said rear door seal channel are coplanar.

15. A partition bracket assembly, comprising:

a front clamp bracket comprising a planar rearwardly extending portion and a leading portion, wherein said leading portion is connected to a front door seal channel and said rearwardly extending portion is connected to a rear flange;

a channel mounting bracket comprising two planar tabs, said tabs connected to a transverse downwardly extending portion, said channel mounting bracket having a fastener flange, wherein a lower surface of said tabs is in direct overlapping contact with an upper surface of the rearwardly extending portion, wherein said tabs are partially located within slots of the rear flange; and a rear clamp bracket comprising a plurality of legs and a rear door seal channel, wherein an outside surface of a leg of said rear clamp bracket is in direct overlapping contact with an inside surface of the downwardly extending portion.

* * * * *